US012151256B2

United States Patent
Ichii et al.

(10) Patent No.: US 12,151,256 B2
(45) Date of Patent: Nov. 26, 2024

(54) VEHICLE WHEEL DECORATION METHOD AND DECORATION DEVICE

(71) Applicant: BBS Japan CO., LTD., Toyama (JP)

(72) Inventors: Katsutoshi Ichii, Toyama (JP); Takeshi Tanaka, Toyama (JP); Rui Yokogawa, Toyama (JP)

(73) Assignee: BBS Japan CO., LTD., Toyama (JP)

( * ) Notice: Subject to any disclaimer, the term of this patent is extended or adjusted under 35 U.S.C. 154(b) by 581 days.

(21) Appl. No.: 17/603,295

(22) PCT Filed: Mar. 30, 2020

(86) PCT No.: PCT/JP2020/014605
§ 371 (c)(1),
(2) Date: Oct. 12, 2021

(87) PCT Pub. No.: WO2020/213383
PCT Pub. Date: Oct. 22, 2020

(65) Prior Publication Data
US 2022/0193711 A1    Jun. 23, 2022

(30) Foreign Application Priority Data
Apr. 19, 2019 (JP) .................... 2019-080156

(51) Int. Cl.
*B05B 13/04* (2006.01)
*B05D 1/02* (2006.01)
(Continued)

(52) U.S. Cl.
CPC ............ *B05B 13/0442* (2013.01); *B05D 1/02* (2013.01); *B05D 7/14* (2013.01); *B60B 3/10* (2013.01); *B60B 2310/656* (2013.01)

(58) Field of Classification Search
None
See application file for complete search history.

(56) References Cited

U.S. PATENT DOCUMENTS 8,833,865 B2 * 9/2014 Niedermayer .......... B60B 21/00
301/51
9,352,614 B2 * 5/2016 Niedermayer .......... B60B 21/00
(Continued)

FOREIGN PATENT DOCUMENTS

CA           1199665 A      1/1986
CN        101940993 A      1/2011
(Continued)

OTHER PUBLICATIONS

Office Action for corresponding Chinese Application No. 202080029048.9, dispatched on Jul. 13, 2022.
(Continued)

*Primary Examiner* — Jethro M. Pence
(74) *Attorney, Agent, or Firm* — Procopio, Cory, Hargreaves & Savitch LLP (57) ABSTRACT

A vehicle wheel decoration method includes a setting step of detachably holding a wheel body in the holding member such that the wheel design face faces the discharge nozzle, and a decoration step of forming a decorative layer on the wheel design face by discharging paint from a discharge opening of the discharge nozzle toward the wheel design face while relatively moving the discharge nozzle in two directions with respect to the wheel design face of the wheel body held in the holding member, and, in the decoration step, the wheel body is relatively inclined in a direction which crosses moving directions toward the two directions by a relative move of one of the discharge nozzle and the holding member or relative moves of both of the discharge nozzle and the holding member, and the discharge opening of the discharge nozzle is relatively moved in the two directions.

10 Claims, 7 Drawing Sheets

(51) Int. Cl.
  *B05D 7/14* (2006.01)
  *B60B 3/10* (2006.01)

(56) References Cited

U.S. PATENT DOCUMENTS

| | | | |
|---|---|---|---|
| 9,597,865 B2 * | 3/2017 | Xue | ................ B41F 17/28 |
| 2015/0075423 A1 | 3/2015 | Kishi et al. | |
| 2016/0001591 A1 | 1/2016 | Inantani et al. | |
| 2017/0320080 A1 | 11/2017 | Kakar et al. | |
| 2019/0233945 A1 * | 8/2019 | Kakar | .................... B05D 3/142 |
| 2022/0160110 A1 | 5/2022 | Lotti | |
| 2022/0193711 A1 * | 6/2022 | Ichii | ..................... B60B 3/10 |

FOREIGN PATENT DOCUMENTS

| | | |
|---|---|---|
| CN | 104437932 A | 3/2015 |
| CN | 104707764 A | 6/2015 |
| CN | 107000469 A | 8/2017 |
| EP | 0364608 A1 | 4/1990 |
| JP | S62-076006 U | 5/1987 |
| JP | 2007-167769 A | 7/2007 |
| JP | 2012-228660 A | 11/2012 |
| JP | 2015182481 A | 10/2015 |
| JP | 2017-070874 A | 4/2017 |
| JP | 2017226888 A | 12/2017 |
| JP | 2018504272 A | 2/2018 |
| JP | 6417131 B2 | 10/2018 |

OTHER PUBLICATIONS

European Patent Office, Extended European Search Report, Application No. 20791098.5, dated Jan. 9, 2023, in 6 pages.
Patent Cooperation Treaty, International Search Report, Application No. PCT/JP2020/014605, dated Jun. 16, 2020, in 6 pages.
Japanese Patent Office, Notice of Reasons for Refusal, Application No. JP2020-535159, dated Jul. 29, 2020 in 6 pages.
Patent Cooperation Treaty, Written Opinion of the International Searching Authority, Application No. PCT/JP2020/014605, dated Jun. 16, 2020, in 6 pages.
Taiwanese Patent Office, Office Action, Application No. 109112423, dated Aug. 11, 2023, in 6 pages.

* cited by examiner

VEHICLE WHEEL DECORATION METHOD AND DECORATION DEVICE

TECHNICAL FIELD

The present invention relates to a vehicle wheel decoration method used for variously decorating a wheel design face in a three-dimensional shape in a vehicle wheel easily, and a decoration device for manufacturing a vehicle wheel.

BACKGROUND ART

Conventionally, as a vehicle wheel decoration method of this type, there is a method in which, in a state where a vehicle wheel including a rim and a disc having a plurality of spokes is mounted to a vehicle, a wheel design face in a three-dimensional shape which can be seen from the outside is decorated by a dispenser (see, e.g., PTL 1).

As the dispenser, a dispenser having a dispenser nozzle movable along three axes including a front-and-rear direction (X-axis), a left-and-right direction (Y-axis), and an up-and-down direction (Z-axis), or a dispenser nozzle movable along five axes including rotation about the X-axis (A rotation) and rotation about the Y-axis (B rotation), in addition to the above three axes, is used.

Further, with regard to the dispenser, the dispenser nozzle is moved along three or five axes based on an NC program and discharges and applies solvent paint so as to draw lines and dots while a specific clearance between the dispenser nozzle and an applied face is held along the spokes serving as the wheel design face and a move in each of the directions of the three or five axes of the dispenser and both of feed speed and a paint discharge amount are relatively controlled, and a decorative layer of a type which can be expressed by drawing is formed on the entire spokes.

CITATION LIST

Patent Literature

[PTL 1] Japanese Patent No. 6417131

SUMMARY OF INVENTION

Technical Problem

However, in PTL 1, the dispenser is supported so as to be movable along the three axes or the five axes with respect to the entire wheel design face and is subjected to move control in each of the directions of the three axes or the five axes with the NC program, and hence not only a support structure of the dispenser but also the move control of the dispenser in each of the directions of the three axes or the five axes with the NC program is complicated.

Hence, a problem arises in that cost is increased by the complication of the entire device including the support structure of the dispenser.

Further, a problem arises in that the move control of the dispenser with respect to different wheel design faces of many types is complicated and control setting requires longer time and more effort and, when even a slight drawing change of the wheel design face is made, it is difficult to easily create the NC program.

In addition, a move area of the dispenser (dispenser nozzle) in the wheel design face in the three-dimensional shape extends over a wide range of the entire wheel design face, and hence a problem arises in that the size of each of the support structure of the dispenser and the entire device is increased, and an installation place thereof is thereby limited and cost is thereby increased.

Solution to Problem

In order to solve such problems, a vehicle wheel decoration method according to the present invention is a vehicle wheel decoration method for decorating a wheel design face in a three-dimensional shape formed from a hub part to a rim part via a disc part in a wheel body, the vehicle wheel decoration method including: a setting step of detachably holding the wheel body in a holding member such that the wheel design face faces a discharge nozzle; and a decoration step of forming a decorative layer on the wheel design face by discharging paint from a discharge opening of the discharge nozzle toward the wheel design face while relatively moving the discharge nozzle in two directions which extend along the wheel design face and cross each other with respect to the wheel design face of the wheel body held in the holding member, wherein, in the decoration step, the wheel body is relatively inclined in a direction which crosses moving directions toward the two directions by a relative move of one of the discharge nozzle and the holding member or relative moves of both of the discharge nozzle and the holding member, and the discharge opening of the discharge nozzle is relatively moved in the two directions along the wheel design face, with a distance from the discharge opening to the wheel design face falling within a predetermined range.

In addition, in order to solve such problems, a vehicle wheel decoration device according to the present invention is a vehicle wheel decoration device for decorating a wheel design face in a three-dimensional shape formed from a hub part to a rim part via a disc part in a wheel body, the vehicle wheel decoration device including: a discharge nozzle which is provided so as to face the wheel design face of the wheel body; a holding member which detachably holds the wheel body; a relative moving mechanism which relatively moves one of the wheel body held in the holding member and the discharge nozzle or both of the wheel body and the discharge nozzle in at least two directions which extend along the wheel design face and cross each other and a direction which crosses moving directions toward the two directions; and a control part which performs operation control of the discharge nozzle and the relative moving mechanism, wherein the discharge nozzle has a discharge opening which discharges paint toward the wheel design face to form a decorative layer on the wheel design face, and the control part performs control such that the holding member is tilted with respect to the discharge nozzle such that a distance from the discharge opening to the wheel design face falls within a predetermined range, and the discharge nozzle relatively moves in the two directions along the wheel design face, by using the relative moving mechanism.

BRIEF DESCRIPTION OF DRAWINGS

FIG. 1(*a*) is an explanatory view showing a vehicle wheel decoration method and an overall structure of a vehicle wheel decoration device according to an embodiment (first embodiment) of the present invention, and FIG. 1(*a*) is a transverse plan view when a setting step and a decoration step are started.

FIG. 1(*b*) is an explanatory view showing a vehicle wheel decoration method and an overall structure of a vehicle wheel decoration device according to an embodiment (first embodiment) of the present invention, and FIG. 1(b) is a longitudinal front view when the setting step and the decoration step are started.

FIG. 2(a) is an explanatory view showing the overall decoration step, and FIG. 2(a) is a transverse plan view.

FIG. 2(b) is an explanatory view showing the overall decoration step, and FIG. 2(b) is a longitudinal front view.

FIG. 3(a) is a perspective view of a first inclination state.

FIG. 3(b) is an explanatory view showing modifications of the vehicle wheel decoration method and the vehicle wheel decoration device according to the embodiment (first embodiment) of the present invention, and FIG. 3(b) is a perspective view of a second inclination state.

FIG. 4(a) is an explanatory view showing a vehicle wheel decoration method and an overall structure of a vehicle wheel decoration device according to an embodiment (second embodiment) of the present invention, and FIG. 4(a) is a transverse plan view when an outline is formed in the setting step and the decoration step.

FIG. 4(b) is an explanatory view showing a vehicle wheel decoration method and an overall structure of a vehicle wheel decoration device according to an embodiment (second embodiment) of the present invention, and FIG. 4(b) is a longitudinal front view when the outline is formed in the setting step and the decoration step.

FIG. 5(a) is an explanatory view showing the overall formation of the outline, and FIG. 5(a) is a transverse plan view.

FIG. 5(b) is an explanatory view showing the overall formation of the outline, and FIG. 5(b) is a longitudinal front view.

FIG. 6(a) is an explanatory view showing the vehicle wheel decoration method and the overall structure of the vehicle wheel decoration device according to the embodiment (second embodiment) of the present invention, and FIG. 6(a) is a transverse plan view at the time of a fill in the decoration step.

FIG. 6(b) is an explanatory view showing the vehicle wheel decoration method and the overall structure of the vehicle wheel decoration device according to the embodiment (second embodiment) of the present invention, and FIG. 6(b) is a longitudinal front view at the time of the fill in the decoration step.

FIG. 7(a) is an explanatory view showing the overall fill, and FIG. 7(a) is a transverse plan view.

FIG. 7(b) is an explanatory view showing the overall fill, and FIG. 7(b) is a longitudinal front view.

DESCRIPTION OF EMBODIMENTS

Hereinbelow, embodiments of the present invention will be described in detail based on the drawings.

As shown in FIGS. 1(a) and 1(b) to 7(a) and 7(b), a decoration method of a vehicle wheel A according to an embodiment of the present invention is a coating method for forming a decorative layer d of drawings, patterns, signs, and letters on a wheel design face D in a three-dimensional shape disposed on the front side of a wheel body A1 in a state in which the wheel body A1 is mounted to a vehicle (not shown).

In the wheel body A1, a hub part 1, a disc part 2, and a rim part 3 are formed by casting or spinning with, e.g., a light alloy such as an aluminum alloy or a material similar thereto. The hub part 1 is a central cylindrical portion having a hub hole 1a to which an axle (not shown) is mounted in the wheel body A1. The disc part 2 is an annular portion provided in a peripheral edge of the hub part 1 in the wheel body A1. The rim part 3 is an outer peripheral annular portion provided in a peripheral edge of the disc part 2 in the wheel body A1.

The type of the wheel body A1 includes a wheel body having an integral structure of the hub part 1 and the disc part 2, and a wheel body having a division structure of the disc part 2 and the rim part 3.

The wheel design face D in the three-dimensional shape in the wheel body A1 is formed so as to be extended from the hub part 1 to the rim part 3 via the disc part 2 which are seen from the outside in a state in which the wheel body A1 is mounted to the vehicle. The wheel design face D in the three-dimensional shape includes a design (concave) in which part or the whole of the disc part 2 which serves as a front-side central part of the wheel body A1 or the hub part 1 is depressed to be lower than the rim part 3.

In the wheel design face D in the three-dimensional shape, there are cases where the decorative layer D is formed in all of the hub part 1, the disc part 2, and the rim part 3, and there are cases where the decorative layer D is formed only in part of the hub part 1, the disc part 2, and the rim part 3.

The shape of the disc part 2 includes a spoke type and a fin type. Most of the spoke types and the fin types are formed into shapes which are rotationally symmetric in a circumferential direction of the wheel body A1 with the hub hole 1a positioned at the center. The spoke type often has a five to nine-fold (rotationally) symmetric shape, and the fin type often has a five to ten-fold (rotationally) symmetric shape.

In the case of a specific example of the disc part 2 shown in each of FIGS. 1(a) and 1(b) to 3(a) and 3(b) and FIGS. 4(a) and 4(b) to 7(a) and 7(b), the shape of the specific example thereof is a five-fold (rotationally) symmetric spoke type.

In addition, although not shown in the drawing as another example of the disc part 2, it is also possible to use a less than four-fold (rotationally) symmetric spoke type or fin type, or a six or more-fold (rotationally) symmetric spoke type or fin type.

That is, in the wheel design face D in the three-dimensional shape, even when the type of the disc part 2 differs, as in an example shown in the drawing, in the case where the shape of the disc part 2 is a shape which is rotationally symmetric in the circumferential direction of the wheel body A1, it becomes possible to divide the wheel design face D into positions each having a single shape which is rotationally symmetric in the circumferential direction, and individually decorate a plurality of divided positions D1. Thus, the continuous decorative layer d is completed by sequentially performing partial decoration on the plurality of rotationally symmetric divided positions D1 of the wheel design face D and repeating the decoration on all of the plurality of divided positions D1 eventually.

Further, on an entire surface of the wheel body A1, for the purpose of increasing resistance to corrosion, chemical conversion treatment such as alkaline cleaning or non-chromium treatment is performed as pretreatment. After the wheel body A1 on which a chemical conversion coating layer (not shown) is formed is rinsed and dried, primer paint is applied for the purpose of corrosion proofing or levelling, and a primer layer (not shown) is formed. In addition, there are cases where polishing such as barrel polishing is performed before the chemical conversion treatment on an as needed basis.

After the pretreatment is performed on the entire surface of the wheel body A1, a decorative coating corresponding to each of the wheel design faces D of many types is performed, and post-treatment on the entire surface of the wheel body A1 is performed.

As an example thereof, a colored base color layer (not shown) is formed by applying colored paint having the base color on a chemical conversion coating and the primer layer, and the decorative layer d described later is formed on the base color layer. On the decorative layer d, a top coat layer (not shown) is formed by a top clear coating or color clear coating as the post-treatment.

As another example, the chemical conversion coating and the primer layer are formed after polishing, a middle layer (not shown) is formed with a mirror-finished clear coating or color clear coating on the primer layer, and the decorative layer d described later is formed on the middle layer. On the decorative layer d, the top coat layer (not shown) is formed by the top clear coating or color clear coating as the post-treatment.

In addition, as an example other than the above examples, it is also possible to make a change such as directly forming the decorative layer d described later on the polishing, the chemical conversion coating and the primer layer, and forming the top coat layer on the decorative layer d by the top clear coating or color clear coating as the post-treatment.

Specific examples of the decorative layer d described later include various types which can be expressed by decorations of desired drawings, designs, patterns, signs, logo marks, and letters, and the color of the decorative layer d is not limited to a single color and a plurality of colors and polychrome can also be used.

A decoration device B of the vehicle wheel A according to the embodiment of the present invention includes, as main components, a discharge nozzle 10 of paint which is provided so as to face the wheel design face D of the wheel body A1, a holding member 20 for detachably holding the wheel body A1, and a relative moving mechanism for relatively moving one of the wheel body A1 held in the holding member 20 and the discharge nozzle 10, or both of the wheel body A1 and the discharge nozzle 10.

The relative moving mechanism has a nozzle driving part 30 for relatively moving the discharge nozzle 10 with respect to the wheel body A1 held in the holding member 20, and a wheel driving part 41 for relatively moving the holding member 20 with respect to the discharge nozzle 10. By operating one of the nozzle driving part 30 and the wheel driving part 41 or both of the nozzle driving part 30 and the wheel driving part 41, the discharge nozzle 10 and the wheel body A1 relatively move.

Further, there are provided a rotation driving part 42 for rotationally moving the holding member 20 in the circumferential direction of the wheel body A1, and a control part 50 for performing operation control of the discharge nozzle 10, the relative moving mechanism (the nozzle driving part 30 and the wheel driving part 41), and the rotation driving part 42.

In addition, relative moving directions of the discharge nozzle 10 and the wheel body A1 by the relative moving mechanism (the nozzle driving part 30 and the wheel driving part 41) are at least two directions which extend along the wheel design face D and cross each other, and a direction which crosses the two directions extending along the wheel design face D. The two directions are two directions which intersect each other at a given point in two-dimensional space (two-dimensional plane) substantially parallel to the wheel design face D. A first direction which is one of the two directions includes a radial direction which passes through the center of the wheel body A1, and a straight direction parallel to a radial direction which does not pass through the center of the wheel body A1.

Further, the relative moving directions of the discharge nozzle 10 and the wheel body A1 by the relative moving mechanism (the nozzle driving part 30 and the wheel driving part 41) include, in addition to the two directions which extend along the wheel design face D, a three-dimensional direction including a direction in which the discharge nozzle 10 and the wheel design face D approach each other or move away from each other such as an axial direction of the wheel body A1 which crosses the two directions, and a four or more-dimensional direction.

Figures 1A, 1B:
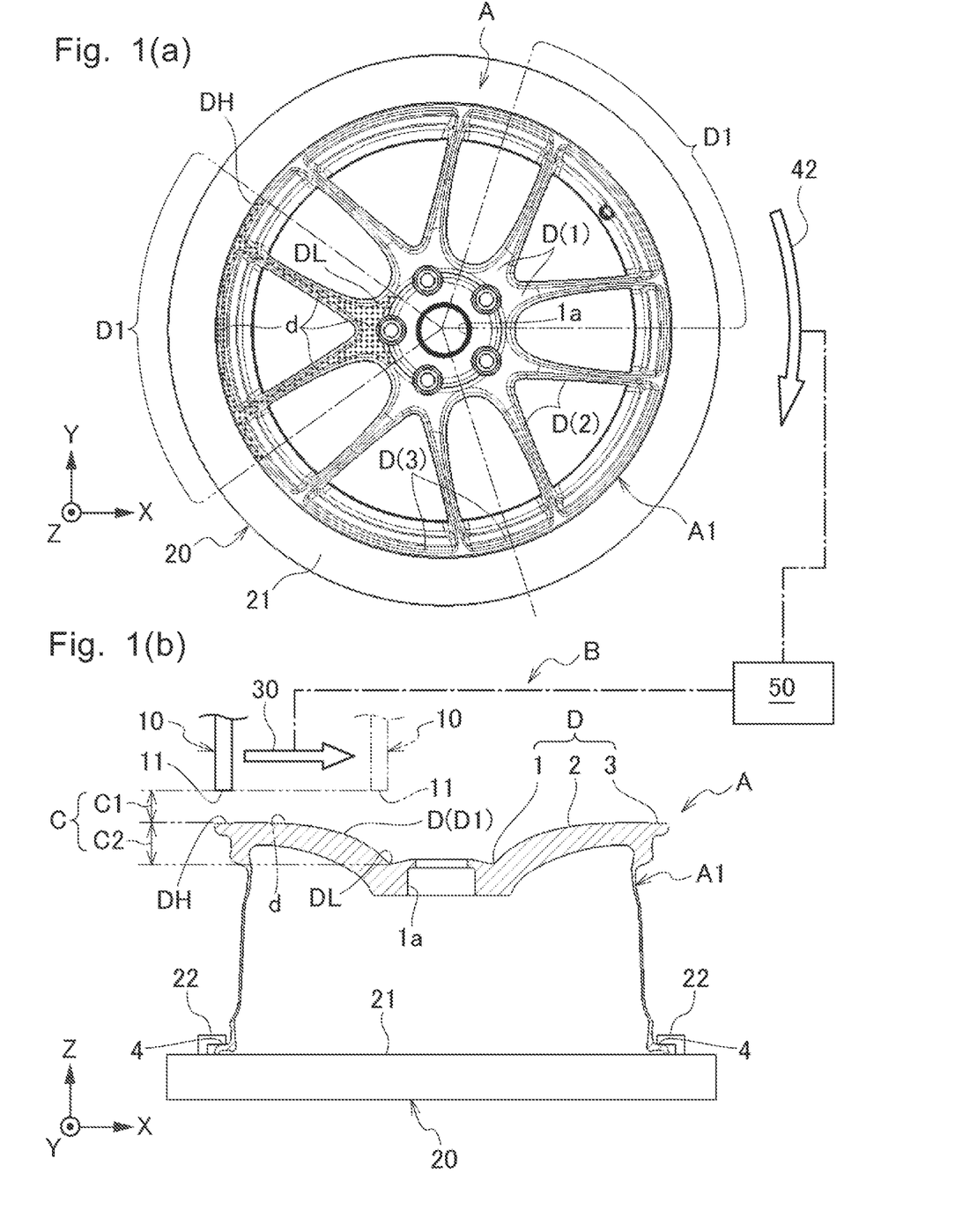
Figure 3A:
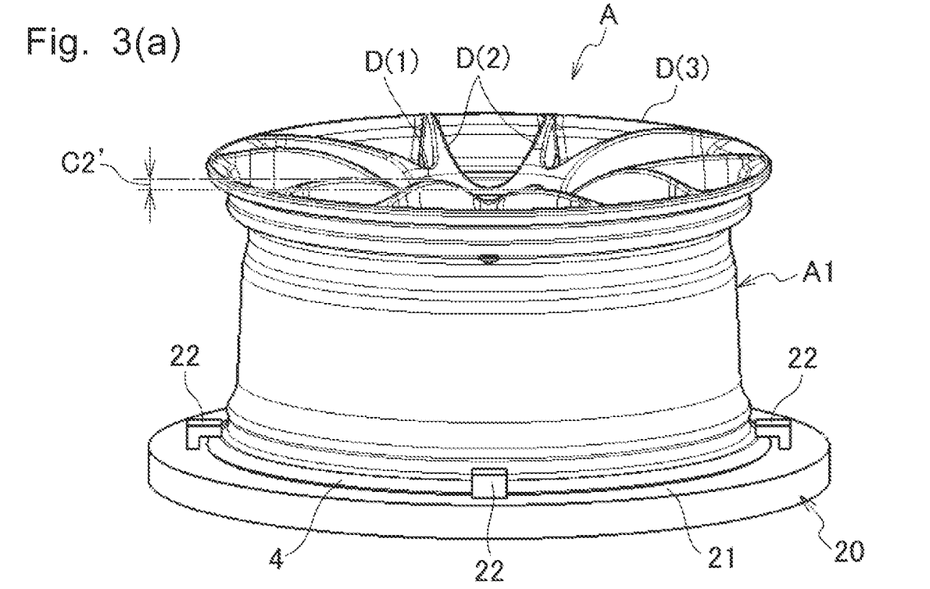
FIG. 3(a) is an explanatory view showing modifications of the vehicle wheel decoration method and the vehicle wheel decoration device according to the embodiment (first embodiment) of the present invention.
Figure 3B:
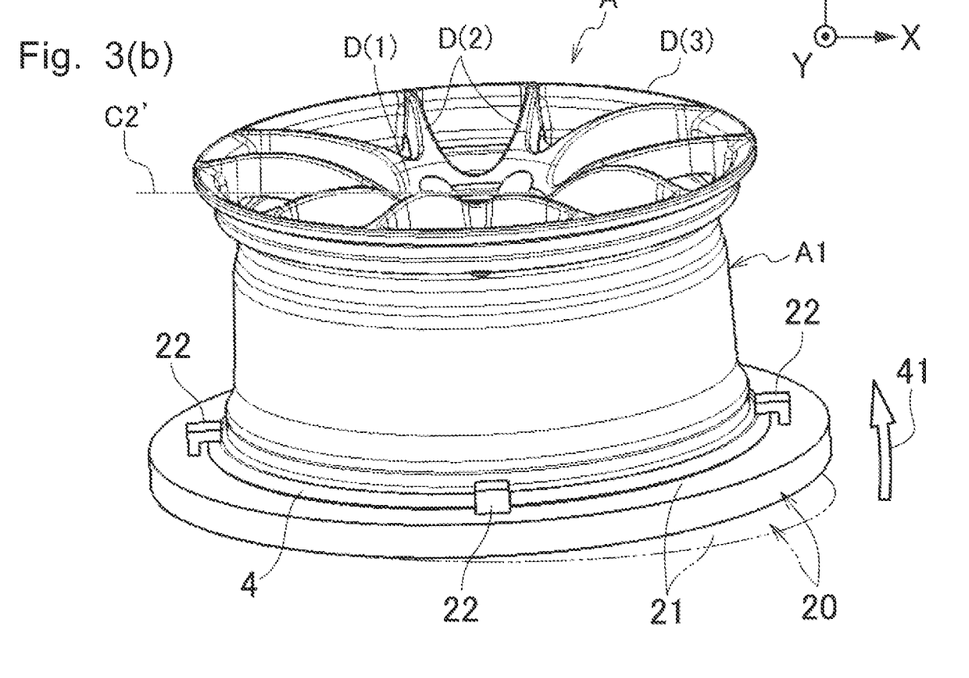
Figure 4A:
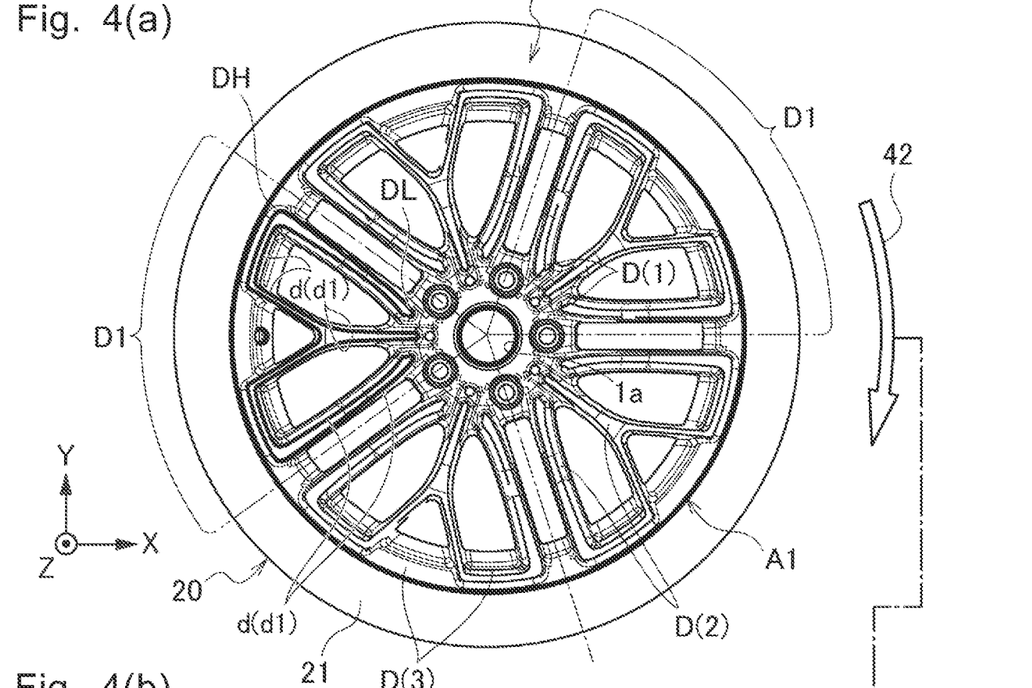
Figure 4B:
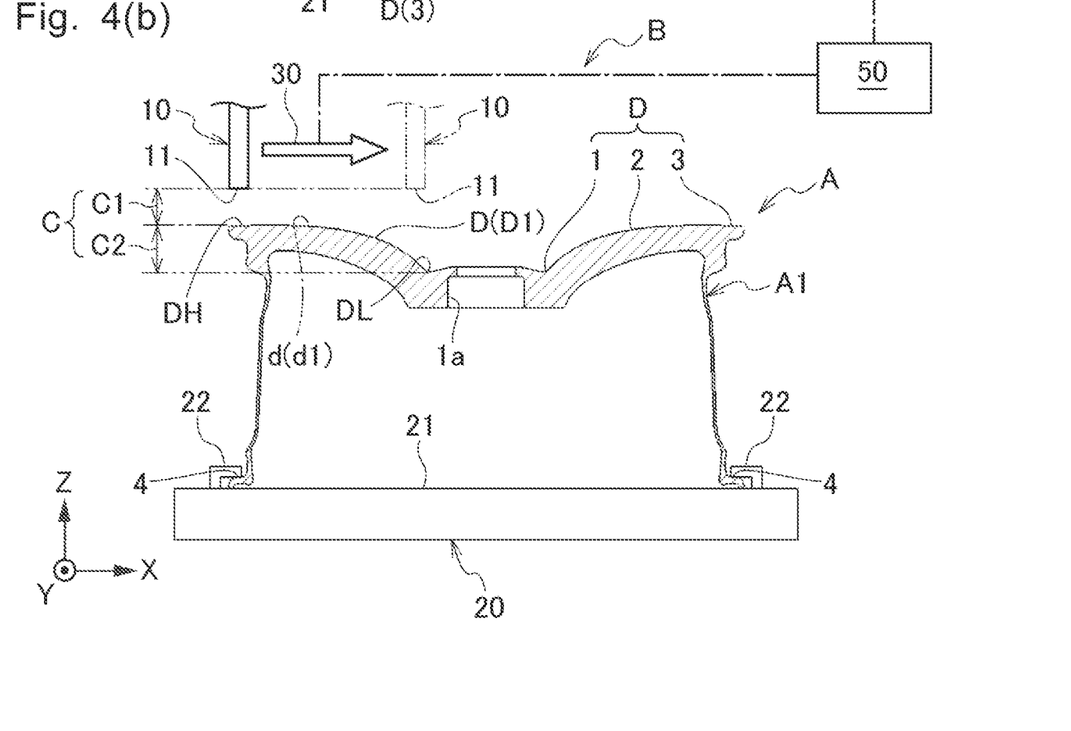
Figure 5A:
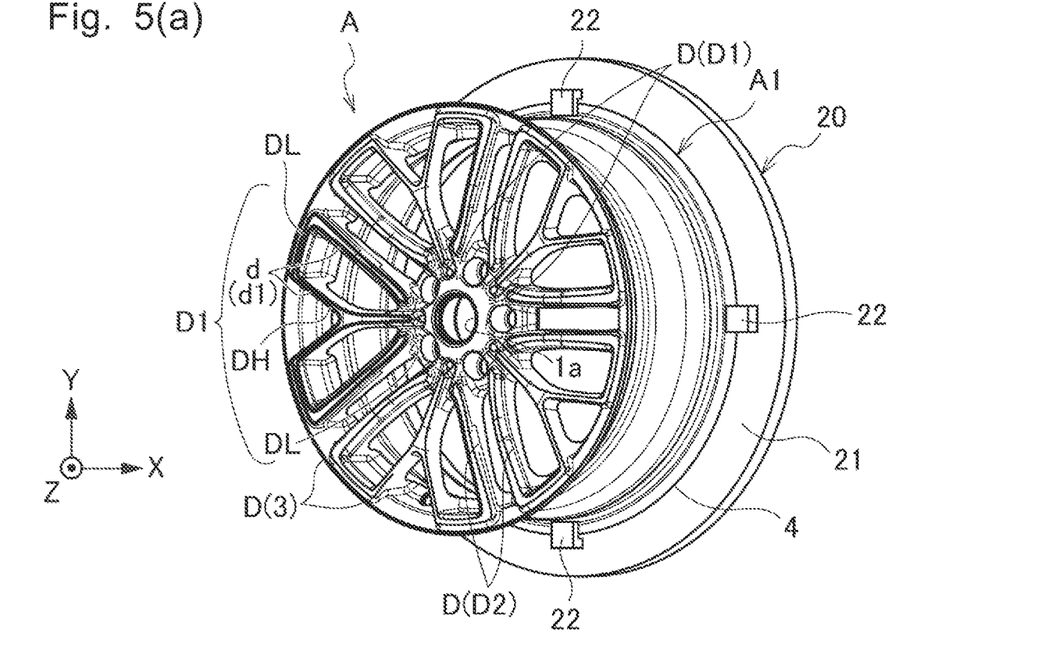
Figure 5B:
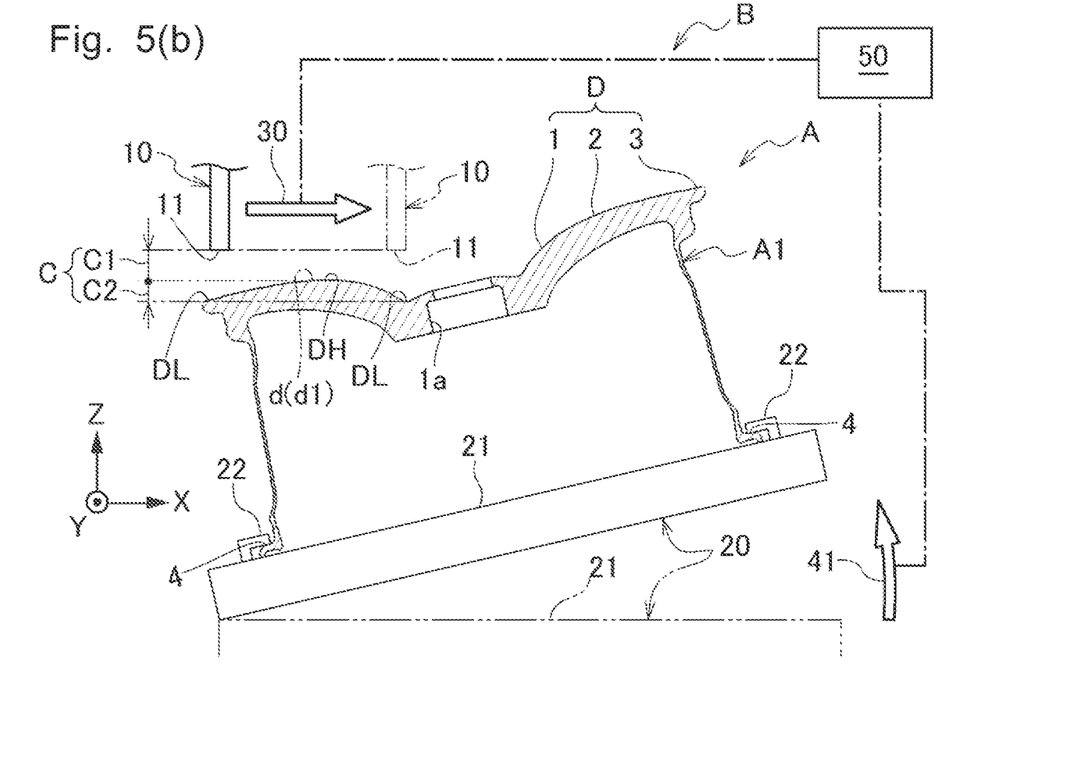

Note that the wheel body A1 is usually disposed such that the front side having the wheel design face D is directed upward with respect to the holding member 20, as shown in each of FIGS. 1(*a*) and 1(*b*) to 3(*a*) and 3(*b*) and FIGS. 4(*a*) and 4(*b*) to 7(*a*) and 7(*b*).

Herein, as shown in FIGS. 1(*a*) and 1(*b*), in a state in which the wheel body A1 is horizontally disposed, the axial direction of the wheel body A1 is referred to as "Z direction" hereinafter. Two directions crossing or orthogonal to the Z direction are referred to as "XY directions" hereinafter. Accordingly, in the following description and in the case of examples shown in the drawings, the two directions which extend along the wheel design face D and cross each other are the "XY directions", and the direction crossing or orthogonal to the two directions is the Z direction.

The discharge nozzle 10 is a coating head which communicates with a paint supply source (not shown), and a discharge opening 11 which is opened toward the wheel design face D and discharges paint is provided at the tip of the discharge nozzle 10.

The discharge opening 11 of the discharge nozzle 10 is supported so as to be movable in at least the two directions (XY directions) which extend along the wheel design face D of the wheel body A1 and cross each other with respect to the wheel body A1 held in the holding member 20 described later. In addition, the discharge opening 11 can be supported so as to be movable in the direction (Z direction) which crosses the two directions (XY directions) which extend along the wheel design face D.

Further, the discharge nozzle 10 has a supply driving part (not shown) which supplies paint toward the discharge opening 11 from the supply source.

The supply driving part is provided in a duct which causes the paint supply source and the discharge nozzle 10 to communicate with each other, is structured to be able to set discharge start and stop timings and a discharge amount of the paint, and is controlled by the control part 50 described later.

As a specific example of the coating head serving as the discharge nozzle 10, it is preferable to use an inkjet head which makes ink serving as paint into fine droplets and directly sprays the fine droplets toward the wheel design face D.

More specifically, it is preferable to use, among the inkjet heads, a piezoelectric type inkjet head which discharges ink with mechanically applied pressure using an electrically deformable piezoelectric element, and also functions as a multi-path type inkjet head which performs decoration while moving planarly in two directions which are orthogonal to each other. In this case, the supply driving part of the discharge nozzle 10 corresponds to the piezoelectric element. In addition, with regard to the nozzle diameter of the inkjet head serving as the discharge opening 11, it is preferable to use the inkjet head with a nozzle diameter of not more than about 40 µm which has a long straight spray distance.

The holding member 20 has a wheel holding face 21 which faces a back surface side on which the wheel design face D is not disposed in the wheel body A1, and is constituted by a stand called a table or a stage capable of adjustment to any position by moving the wheel holding face 21 with respect to the discharge nozzle 10.

The wheel holding face 21 is structured to tilt in the direction (Z direction) which crosses at least the two directions (XY directions) which extend along the wheel design face D with respect to the discharge opening 11 of the discharge nozzle 10. With regard to the tilt direction of the wheel holding face 21, the wheel holding face 21 is not limited to a one-axis type which can tilt only in a direction of one axis, and it is also possible to use a multi-axis type which can tilt in directions of two or more axes. In addition, the wheel holding face 21 can be structured to be movable in the two directions (XY directions) which extend along the wheel design face D. Further, the wheel holding face 21 is structured to rotationally move in the circumferential direction of the wheel body A1.

In the wheel holding face 21, chucks 22 for temporarily holding a back-surface-side position or a peripheral-surface-side position of the wheel body A1 are provided, and each chuck 22 is controlled by the control part 50 described later.

In the case of the holding member 20 shown as an example in each of FIGS. 1(a) and 1(b) to 7(a) and 7(b), an inclination table or an inclination stage capable of adjusting an inclination angle to any inclination angle by tilting the wheel holding face 21 only in a direction of one axis, and capable of adjusting a rotation angle to any rotation angle by rotating the wheel holding face 21 in the circumferential direction is used. With regard to the chuck 22, a flange 4 on the back surface side is held and fixed so as not to be movable by a plurality of holding claws provided at predetermined intervals in the circumferential direction of the wheel body A1.

In addition, in the case of the holding member 20 shown as another example in FIGS. 3(a) and 3(b), an inclination table or an inclination stage capable of adjusting the inclination angle to any inclination angle by tilting the wheel holding face 21 in directions of two axes, and capable of adjusting the rotation angle to any rotation angle by rotating the wheel holding face 21 in the circumferential direction is used.

Note that, although not shown as another example, the table, the stage, or the chuck 22 having a structure other than the structures shown as the examples in the drawings can also be used.

The nozzle driving part 30 is constituted by an actuator having the function of reciprocating the discharge opening 11 of the discharge nozzle 10 in at least the two directions (XY directions) which extend along the wheel design face D of the wheel body A1 and cross each other and being able to stop the discharge opening 11 at a desired position. In addition, in the case where, in particular, the wheel design face D in the three-dimensional shape has a design (concave) in which part or the whole of the disc part 2 serving as the front-side central part of the wheel body A1 or the hub part 1 is depressed to be lower than the rim part 3, the nozzle driving part 30 reciprocates the discharge opening 11 of the discharge nozzle 10 in the direction (Z direction) which crosses the two directions (XY directions) which extend along the wheel design face D.

Specific examples of the actuator serving as the nozzle driving part 30 include not only equipment which is movable along two axes such as an X-Y plotter but also equipment which is movable along three axes including the Z direction in addition to the XY directions and equipment which is movable along five axes additionally including two rotation inclination axes in addition to the above three axes.

The move function of the actuator serving as the nozzle driving part 30 is controlled by the control part 50 described later.

By the operation control of the nozzle driving part 30 by the control part 50, as shown in FIG. 1(b) or the like, the discharge opening 11 of the discharge nozzle 10 is set to wait at a position where the discharge opening 11 faces part of the wheel design face D held by the wheel holding face 21 in the Z direction in an initial state.

Further, by the operation control of the nozzle driving part 30 by the control part 50, as shown in FIGS. 1(a) and 1(b) to 3(a) and 3(b) and FIGS. 4(a) and 4(b) to 7(a) and 7(b), the move range of the discharge opening 11 is preferably set such that the discharge opening 11 of the discharge nozzle 10 can move in the XY directions on a two dimensional plane having an area corresponding to that of one of the plurality of divided positions D1 which are rotationally symmetric in the circumferential direction of the wheel design face D from the waiting position in the initial state.

In addition, although not shown as another control example, the move range of the discharge opening 11 by the nozzle driving part 30 can also be set such that the discharge opening 11 of the discharge nozzle 10 can move in the XY directions on a two-dimensional plane having an area corresponding to that of the entire wheel design face D from the waiting position in the initial state.

The wheel driving part 41 is constituted by an actuator having the function of tilting the wheel holding face 21 of the holding member 20 in the direction (Z direction) which crosses moving directions toward at least the two directions (XY directions) by the nozzle driving part 30, and being able to stop the tilt of the wheel holding face 21 at a desired angle position.

Specific examples of the actuator serving as the wheel driving part 41 include not only equipment which is capable of tilting in the Z direction but also equipment which is movable along two axes of the XY directions, equipment which is movable along three axes including the Z direction in addition to the XY directions, and equipment which is movable along five axes which additionally includes two rotation inclination axes in addition to the above three axes.

Further, the move function of the actuator serving as the wheel driving part 41 which includes at least tilt is controlled by the control part 50 described later.

The wheel holding face 21 of the holding member 20 is set by the wheel driving part 41 such that the wheel design face D of the wheel body A1 held by the wheel holding face 21 waits at a substantially horizontal angle position in an initial state, as shown in FIGS. 1(a) and 1(b).

Figure 2A:
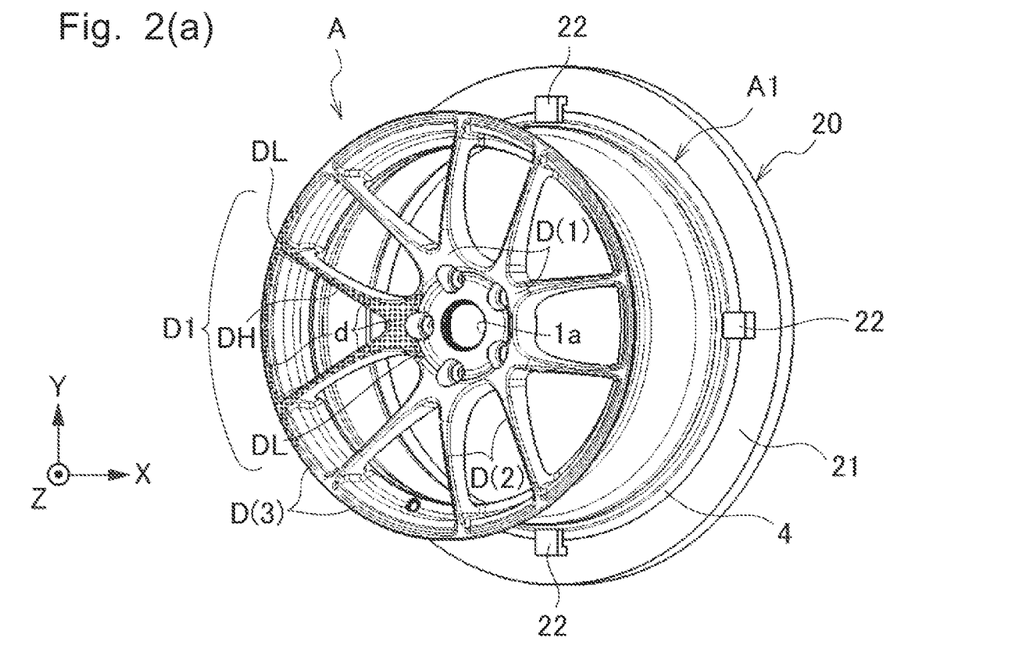
Figure 2B:
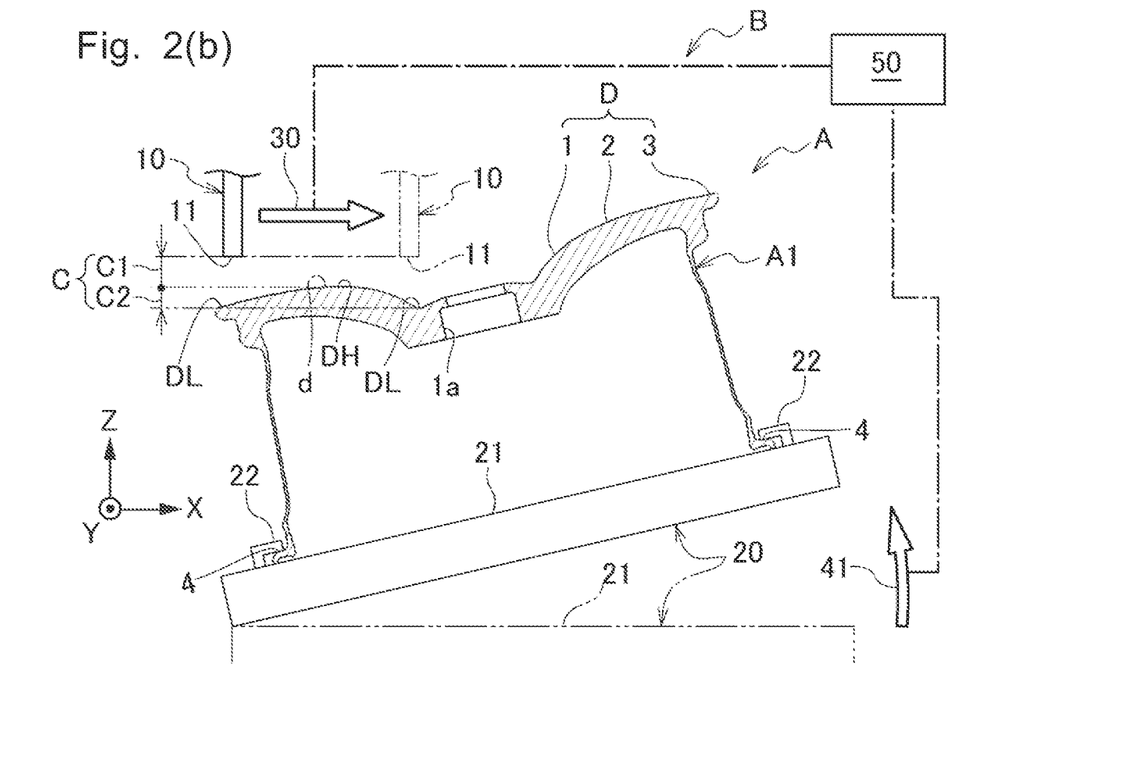

The inclination angle of the wheel holding face 21 by the wheel driving part 41 is set such that the wheel design face D of the wheel body A1 held by the wheel holding face 21 is tilted at an angle at which a distance C from the discharge opening 11 to the wheel design face D falls within a predetermined range, as shown in FIGS. 2(a) and 2(b).

The distance C from the discharge opening 11 to the wheel design face D is the sum of a length C1 from a shortest position DH at which the discharge opening 11 is closest to the wheel design face D to the discharge opening 11, and a difference (height difference) C2 from the shortest position DH of the wheel design face D to a longest position DL at which the discharge opening 11 is most distant from the wheel design face D. When the wheel holding face 21 is tilted such that the difference (height difference) C2 between the shortest position DH and the longest position DL is minimized, the distance C from the discharge opening 11 to the wheel design face D is also minimized.

The rotation driving part 42 is constituted by an actuator having the function of rotationally moving the wheel holding face 21 of the holding member 20 in the circumferential direction of the wheel body A1, and being able to stop the rotation of the wheel holding face 21 at a desired angle position. The rotation function of the actuator serving as the rotation driving part 42 is controlled by the control part 50 described later.

The wheel holding face 21 of the holding member 20 is set by the rotation driving part 42 so as to wait at a position where part of the wheel design face D of the wheel body A1 held by the wheel holding face 21 faces the discharge opening 11 of the discharge nozzle 10 in the Z direction in an initial state shown in FIGS. 1(a) and 1(b) or the like.

In the case of a specific example of the rotation angle of the wheel holding face 21 by the rotation driving part 42 shown as an example in the drawing, the wheel holding face 21 is set so as to be intermittently rotated by an angle (72 degrees in the example shown in the drawing) corresponding to the number of divisions of the plurality of divided positions D1 every time the move of the discharge opening 11 in the X-Y directions by the nozzle driving part 30 with respect to the plurality of divided positions D1 which are rotationally symmetric in the circumferential direction of the wheel design face D is ended. In the example shown in the drawing, the wheel holding face 21 is intermittently rotated by 72 degrees. With this, part of the next divided position D1 is disposed so as to face the discharge opening 11 in the Z direction.

In addition, with regard to another rotation angle of the wheel holding face 21 by the rotation driving part 42, it is possible to set the wheel holding face 21 such that the wheel holding face 21 is rotated intermittently or continuously in response to the move of the discharge opening 11 in the XY directions by the nozzle driving part 30.

Next, a description will be given of an example of a coating method of the wheel design face D by the discharge nozzle 10 (first embodiment).

In the first embodiment, as shown in FIGS. 1(a) and 1(b) to FIGS. 2(a) and 2(b), a substantially uniform decorative layer d is formed by performing planate drawing on the entire wheel design face D.

More specifically, paint is uniformly discharged (sprayed by the same amount) to the entire wheel design face D from the discharge opening 11 while a coating head such as a multi-path type inkjet head is relatively moved in the XY directions from one end of the wheel design face D to the other end thereof. With this, the decorative layer d is drawn so as to have a substantially uniform and planate shape on the entire wheel design face D.

Figure 6A:
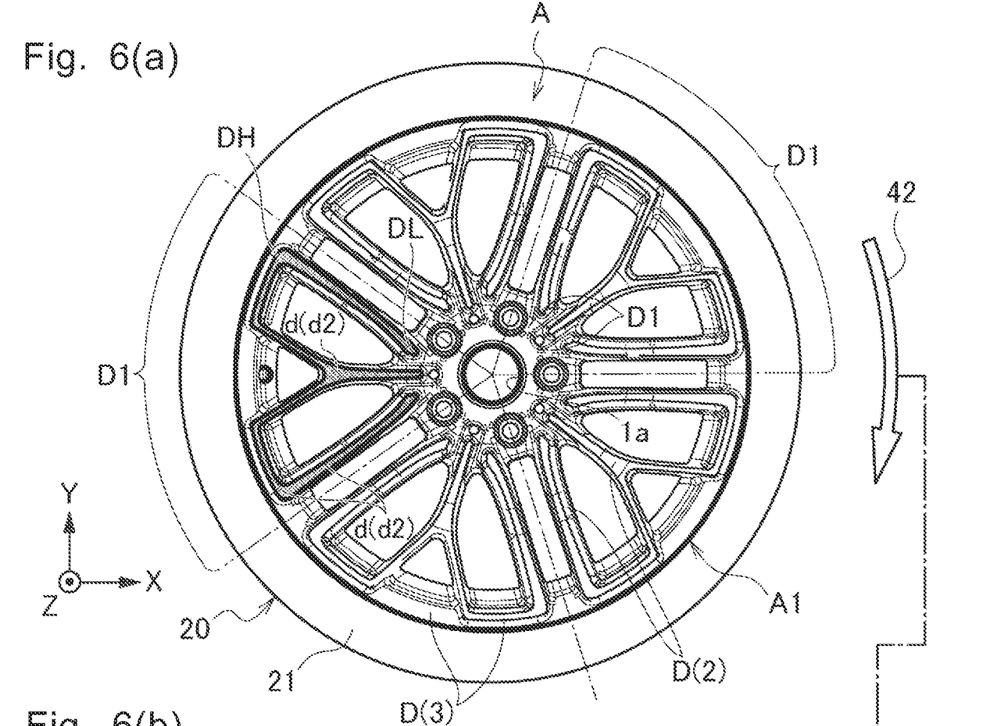
Figure 6B:
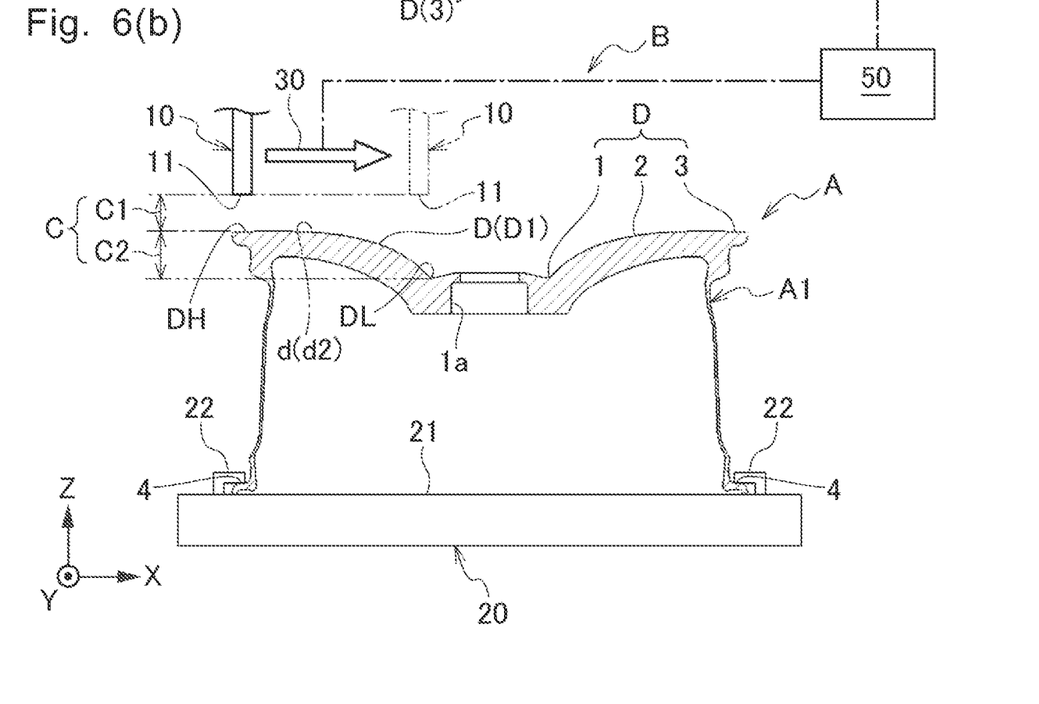
Figure 7A:
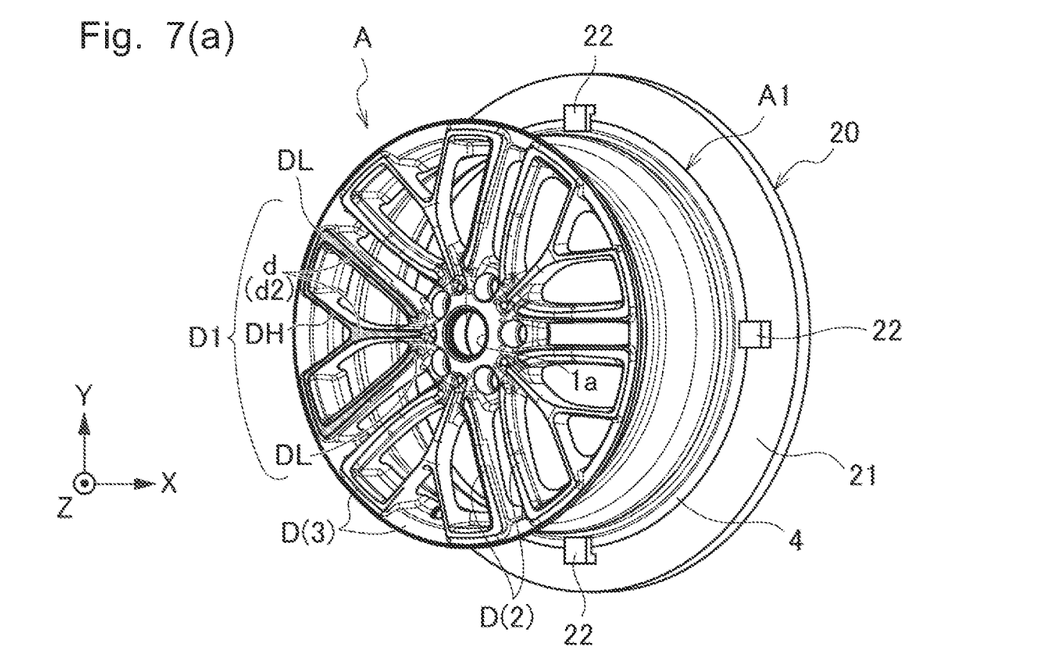
Figure 7B:
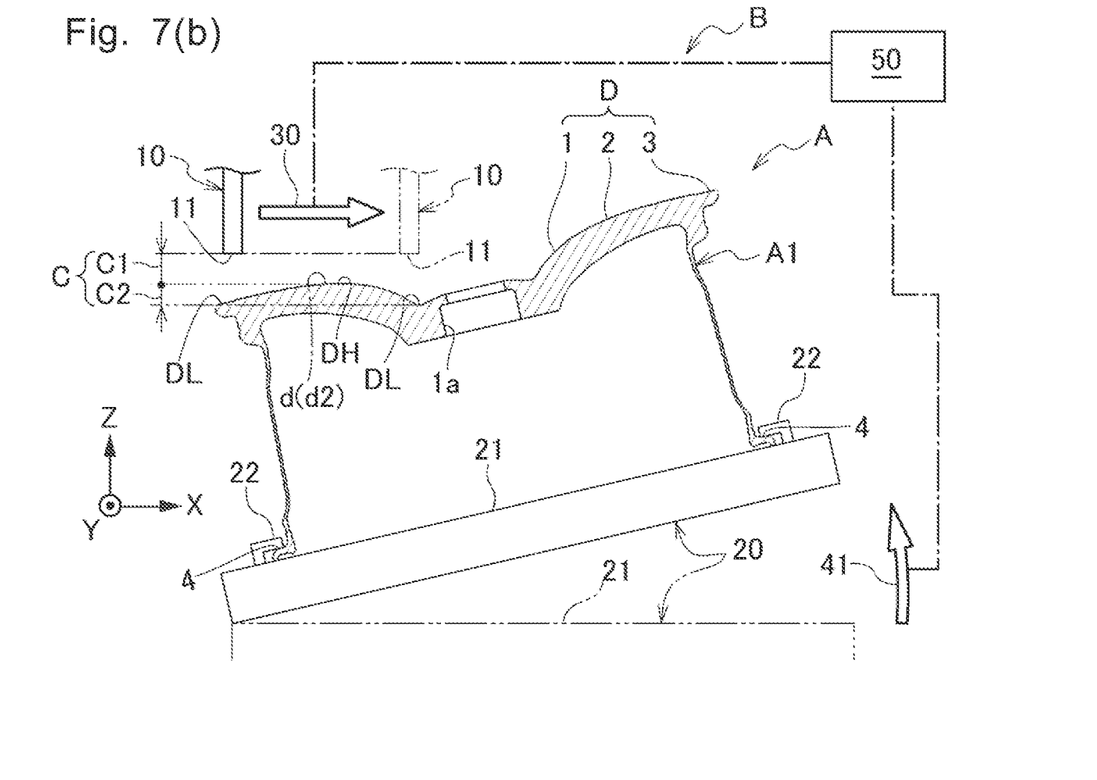

In the case of an example shown in the drawing, a part corresponding to the decorative layer d can be distinguished from a part which is not decorated by drawing a roughly dotted pattern (polka-dotted pattern) in the part corresponding to the decorative layer d, but the present embodiment is not limited thereto, and it is also possible to change the above polka-dotted pattern to a densely dotted drawing similar to that of a planate applied part d2 shown in FIGS. 6(a) and 7(a), and change the polka-dotted pattern to a fill in which dots are joined.

Further, in the example shown in the drawing, the decorative layer d is drawn so as to have the substantially uniform and planate shape for each of the plurality of divided positions D1 as the wheel design face D, and the decorative layer d in which partial decorations drawn in the plurality of divided positions D1 are joined is formed.

In addition, as another example, as shown in FIGS. 4(a) and 4(b) to FIGS. 7(a) and 7(b), it is also possible to change the decorative layer d to the decorative layer d in which partial decorations drawn in the plurality of divided positions D1 are separated from each other.

In the first embodiment, by using the multi-path type inkjet head as the discharge nozzle 10, a discharge test was conducted in consideration of change factors such as the nozzle diameter of the discharge opening 11 and the viscosity of ink used as paint.

In the discharge test, as shown in FIGS. 2(a) and 2(b), the wheel holding face 21 of the holding member 20 was tilted in a direction of one axis by the wheel driving part 41 and the inclination angle of the wheel holding face 21 was set such that the difference (height difference) C2 between the shortest position DH at which the discharge opening 11 was closest to the wheel design face D and the longest position DL at which the discharge opening 11 was most distant from the wheel design face D was not more than about 70 mm, and the difference (height difference) C2 between the shortest position DH and the longest position DL was preferably not more than about 30 mm. With this, the distance C from the discharge opening 11 to the wheel design face D fell within a predetermined range.

Further, as shown in FIG. 3(a), even when the wheel holding face 21 of the holding member 20 is tilted in the direction of one axis by the wheel driving part 41, there are cases where a stepped part C2' is formed in a direction different from the inclination direction of the wheel holding face 21 in part of the wheel design face D (divided position D1).

In these cases, as shown in FIG. 3(b), readjustment was performed by tilting the wheel holding face 21 of the holding member 20 in directions of two axes in addition to the tilt in the direction of one axis with the wheel driving part 41 such that the stepped part C2' formed in part of the wheel design face D (divided position D1) was minimized.

In addition, although not shown in the drawing as another readjustment method, it is also possible to move the wheel holding face 21 of the holding member 20 in each of directions of three or more axes with the wheel driving part 41.

From the result of such a discharge test, it was found that an unclear phenomenon such as blurring did not occur in an outer edge (edge) of the decorative layer d when the difference (height difference) C2 from the shortest position DH to the longest position DL was not more than about 70 mm and, in particular, when the difference (height difference) C2 between the shortest position DH and the longest position DL was not more than about 30 mm, it was possible to reliably prevent the occurrence of the unclear phenomenon such as blurring over the entire decorative layer d including the outer edge (edge) of the decorative layer d, and decoration performance was excellent.

In contrast to this, when the difference (height difference) C2 between the shortest position DH and the longest position DL was more than about 70 mm, it was feared that discharge variations would occur in part of the decorative layer d. Even when there was no problem at a start point of the discharge of the paint from the discharge opening 11, the discharge variations occurred at an end point of the discharge thereof where the difference (height difference) C2 was more than about 70 mm, and the unclear phenomenon such as blurring occurred in the outer edge (edge) of the decorative layer d in some cases.

A description will be given of another example (second embodiment) of the drawing method of the wheel design face D by the discharge nozzle 10.

In the second embodiment, as shown in FIGS. 4(a) and 4(b) to FIGS. 7(a) and 7(b), by partially drawing an outer edge (edge) position and an inner position surrounded by the outer edge position separately in the wheel design face D, a substantially uniform decorative layer d is formed. That is, the decorative layer d in the second embodiment has an outline d1 which is drawn along the outer edge of the wheel design face D, and a planate applied part d2 which is drawn in an inner part except the outer edge in the wheel design face D. The order of drawing of the outline d1 and the planate applied part d2 includes an order in which the planate applied part d2 is drawn in the inner part surrounded by the outline d1 after the outline d1 is drawn, or an order in which the outline d1 is drawn so as to surround an outer part of the planate applied part d2 after the planate applied part d2 is drawn.

More specifically, in the drawing of the outline d1, a coating head such as a plotter-type inkjet head is used as the discharge nozzle 10, and paint is uniformly discharged (sprayed by the same amount) to the entire wheel design face D from the discharge opening 11 while the coating head is relatively moved in the XY directions along the outer edge of the wheel design face D. With this, the substantially uniform outline d1 extending along the outer edge of the wheel design face D is formed.

In the drawing of the planate applied part d2, a coating head such as a multi-path type inkjet head is used, and paint is uniformly discharged (sprayed by the same amount) to the entire inner part except the outer edge of the wheel design face D from the discharge opening 11 while the coating head is relatively moved in the X-Y directions from one end of the inner part except the outer edge of the wheel design face D toward the other end thereof. With this, the planate applied part d2 is formed substantially uniformly in the inner part except the outer edge of the wheel design face D.

In the case of an example shown in the drawing, a part corresponding to the planate applied part d2 can be distinguished from a part which is not decorated by drawing a densely dotted pattern (polka-dotted pattern) in the part corresponding to the planate applied part d2, but the present embodiment is not limited thereto, and it is also possible to change the above polka-dotted pattern to a roughly dotted drawing similar to that of the decorative layer d shown in FIGS. 1(a) and 2(a), and change the polka-dotted pattern to a fill in which dots are joined.

Further, in the example shown in the drawing, the drawing of the outline d1 is performed first, and the drawing of the planate applied part d2 is performed in the inner part surrounded by the outline d1. In addition, in the example shown in the drawing, the outline d1 and the planate applied part d2 are formed for each of the plurality of divided positions D1, and the decorative layer d in which the partial outlines d1 and the partial planate applied parts d2 which are drawn in the plurality of divided positions D1 are separated from each other is formed.

Note that, as another example, as shown in FIGS. 1(a) and 1(b) to FIGS. 2(a) and 2(b), it is also possible to change the decorative layer d to the decorative layer d in which the partial outlines d1 and the partial planate applied parts d2 which are drawn in the plurality of divided positions D1 are joined.

The control part 50 is a controller for electrically connecting to the supply driving part of the discharge nozzle 10, the nozzle driving part 30 and the wheel driving part 41 of the relative moving mechanism, and the rotation driving part 42 and performing numerical control (NC control) and computer numerical control (CNC control).

This controller also electrically connects to the chuck 22 of the wheel holding face 21 in addition to the components described above.

The controller serving as the control part 50 sequentially performs operation control at preset timing according to a program such as an NC program preset in a control circuit (not shown).

Herein, the program set in the control circuit of the control part 50 will be described as a manufacturing method for producing the vehicle wheel A.

The decoration method of the vehicle wheel A according to the embodiment of the preset invention includes, as main steps, a pre-step of performing the above-described pretreatment, a setting step of detachably holding the wheel body A1 in the holding member 20, a decoration step of forming the decorative layer d with paint from the discharge opening 11 while moving the discharge nozzle 10 along the wheel design face D of the wheel body A1, and a post-step of performing the above-described post-treatment.

In the setting step, as shown in FIGS. 1(a) and 1(b), the wheel body A1 subjected to the pretreatment is set in the holding member 20 such that the wheel design face D faces the discharge nozzle 10, and is temporarily held.

More specifically, the wheel body A1 brought in toward the holding member 20 is positioned at a predetermined position in the wheel holding face 21 of the holding member 20 such that the front-side wheel design face D faces the discharge opening 11 of the discharge nozzle 10, and is fixed so as not to be movable with the chuck 22.

In the decoration step, with the operation of one of the nozzle driving part 30 and the wheel driving part 41 of the relative moving mechanism, or the operations of both of the nozzle driving part 30 and the wheel driving part 41, one of the discharge nozzle 10 and the holding member 20 or both of the discharge nozzle 10 and the holding member 20 are relatively moved.

In the case shown in FIGS. 2(a) and 2(b), after the wheel design face D is inclined by the relative tilt of the holding member 20, the discharge nozzle 10 is relatively moved in the two directions (XY directions) which extend along the wheel design face D and cross each other with respect to the wheel body A1 held in the holding member 20. At the same time as this move, paint is discharged toward the wheel design face D from the discharge opening 11 of the discharge nozzle 10, and the decorative layer d is formed on the wheel design face D.

More specifically, first, the wheel holding face 21 of the holding member 20 is relatively tilted in the direction (Z direction) which crosses the moving directions toward the two directions (XY directions) which extend along the wheel design face D and cross each other by the wheel driving part 41 or the like. With this, the entire wheel design face D of the wheel body A1 is inclined toward the discharge nozzle 10, and the difference (height difference) C2 between the shortest position DH and the longest position DL is changed so as to fall within the predetermined range (about 70 mm, preferably about 30 mm).

Next, the discharge opening 11 of the discharge nozzle 10 is relatively moved by the nozzle driving part 30 or the like in the two directions (XY directions) which extend along the inclined wheel design face D (divided position D1) and cross each other. At the same time as this move, paint is discharged toward the wheel design face D (divided position D1) from the discharge opening 11 by the supply driving part of the discharge nozzle 10, and the decorative layer d having a desired shape is formed on the wheel design face D (divided position D1).

In the case where, in particular, the wheel design face D in the three-dimensional shape has a design (concave) in which part or the whole of the disc part 2 serving as the front-side central part of the wheel body A1 or the hub part 1 is depressed to be lower than the rim part 3, the discharge opening 11 of the discharge nozzle 10 is relatively moved in the direction (Z direction) which crosses the two directions (XY directions) which extend along the wheel design face D by the nozzle driving part 30 or the like.

According to the decoration method and the decoration device B of the vehicle wheel A of the embodiment of the present invention, as shown in FIGS. 2(*a*) and 2(*b*), after the wheel design face D of the wheel body A1 is relatively inclined in the direction (Z direction) which crosses the two directions (XY directions) which extend along the wheel design face D and cross each other with respect to the discharge nozzle 10 with the relative moves of the discharge nozzle 10 and the holding member 20 (wheel holding face 21), the discharge nozzle 10 relatively moves in the two directions (XY directions).

With this, the distance C between the discharge opening 11 of the discharge nozzle 10 and the wheel design face D is held in a predetermined range from the hub part 1 serving as the wheel design face D in the three-dimensional shape to the rim part 3 via the disc part 2.

At the same time as this, paint is discharged from the discharge opening 11 toward the wheel design face D, and the decorative layer d is formed at a predetermined position on the wheel design face D.

Consequently, only with the two-dimensional move of one of the discharge nozzle 10 and the holding member 20 (wheel holding face 21) and the inclination of the other one of the discharge nozzle 10 and the holding member 20, it is possible to decorate the wheel design face D in the three-dimensional shape.

As a result, as compared with the conventional art in which the dispenser is supported to be movable along three axes or five axes with respect to the entire wheel design face and the move control of each of the directions of the three axes or the five axes is performed with the NC program, it is possible to simplify the support structure of the discharge nozzle 10 and the like, and it is also possible to simplify the move control of the discharge nozzle 10. Accordingly, it is possible to achieve the simplification of the overall structure of the decoration device B including the support structure of the discharge nozzle 10, and a reduction in the cost of the vehicle wheel A.

Further, it is possible to achieve easy move control of the discharge nozzle 10 and simplify control setting for different wheel design faces D of many types, and it is possible to easily create a control program even when a slight decoration change of the wheel design face D is made, and hence convenience is excellent.

In particular, in the decoration method of the vehicle wheel A, the wheel design face D preferably has the plurality of divided positions D1 which are rotationally symmetric in the circumferential direction of the wheel body A1 and, in the decoration step, decoration is preferably repeated for each of the plurality of divided positions D1 with the rotation of the holding member 20, and the decorative layer d is preferably formed on the entire surface of the wheel design face D eventually.

In addition, the decoration device B of the vehicle wheel A preferably includes the rotation driving part 42 which rotationally moves the holding member 20 in the circumferential direction of the wheel body A1, and the control part 50 preferably performs control such that decoration is repeated for each of the plurality of divided positions D1 which are rotationally symmetric in the circumferential direction of the wheel body A1 with the rotation of the holding member 20 by the rotation driving part 42, and the decorative layer d is formed on the entire wheel design face D eventually.

In this case, the decorative layer d is sequentially formed for each of the plurality of rotationally symmetric divided positions D1 on the wheel design face D with the rotation of the holding member 20, and the decorative layers d are successively formed on the entire wheel design face D eventually by repetition of the decoration.

Consequently, it is possible to limit the move area of the discharge nozzle 10 in the wheel design face D in the three-dimensional shape to a narrow range.

As a result, as compared with the conventional art in which the move area of the dispenser in the wheel design face in the three-dimensional shape extends over a wide range in the entire wheel design face, it is possible to make the support structure of the discharge nozzle 10 to the wheel design face D compact, an installation place is not limited, convenience is excellent because the support structure of the discharge nozzle 10 can be installed anywhere, and it is possible to achieve a further reduction in the cost of the vehicle wheel A.

Further, in the decoration step in the decoration method of the vehicle wheel A, the decorative layer d is preferably formed on the entire surface of the wheel design face D with the outline d1 which is drawn along the outer edge of the wheel design face D and the planate applied part d2 which is drawn in the inner part except the outer edge in the wheel design face D.

In addition, in the decoration device B of the vehicle wheel A, the decorative layer d preferably has the outline d1 which is drawn along the outer edge of the wheel design face D and the planate applied part d2 which is drawn in the inner part except the outer edge in the wheel design face D.

In this case, as shown in FIGS. 4(*a*) and 4(*b*) to 7(*a*) and 7(*b*), the entire boundary part of the decorative layer d is clearly decorated by the outline d1.

Accordingly, even when some discharge variations occur between the start point of the discharge of paint from the discharge opening 11 to the planate applied part d2 and the end point of the discharge thereof due to the change of the distance C from the discharge opening 11 to the wheel design face D within a predetermined range, partial decoration variations are not conspicuous.

Consequently, it is possible to draw the decorative layer d of the wheel design face D (divided position D1) decisively.

As a result, the outer appearance of the decorative layer d of the wheel design face D in the three-dimensional shape is excellent, and its commercial value is improved.

Note that, in the embodiment described above, the description has been given of the example in which the decoration is repeated for each of the plurality of divided positions D1 obtained by division of positions which are rotationally symmetric in the circumferential direction of the wheel body A1 in the wheel design face D, but the present invention is not limited thereto, and the decorative layer d having a desired shape may also be formed on the entire surface of the wheel design face D only with the move of the discharge nozzle 10 in the two directions (XY directions) without dividing the wheel design face D.

Further, in the example shown in the drawing, the outline d1 and the planate applied part d2 are formed for each of the plurality of divided positions D1, but the present invention is not limited thereto, and the outline d1 may be formed along the outer edge of the entire wheel design face D and the planate applied part d2 may be formed in the inner part surrounded by the outline d1 without dividing the wheel design face D.

REFERENCE SIGNS LIST

A Vehicle wheel
A1 Wheel body
B Decoration device
C Distance
D Wheel design face
D1 Divided position
d Decorative layer
d1 Outline
d2 Planate applied part
1 Hub part
2 Disc part
3 Rim part
10 Discharge nozzle
11 Discharge opening
20 Holding member
30 Nozzle driving part
41 Wheel driving part
42 Rotation driving part
50 Control part

What is claimed is:

1. A vehicle wheel decoration method for decorating a wheel design face in a three-dimensional shape formed from a hub part to a rim part via a disc part in a wheel body, the vehicle wheel decoration method comprising:
a setting step of detachably holding the wheel body in a table such that the wheel design face faces a discharge nozzle; and
a decoration step of forming a decorative layer on the wheel design face by discharging paint from a discharge opening of the discharge nozzle toward the wheel design face while relatively moving the discharge nozzle in two directions which extend along the wheel design face and cross each other with respect to the wheel design face of the wheel body held in the table,
wherein, in the decoration step, the wheel body is relatively inclined in a direction which crosses moving directions toward the two directions by a relative move of one of the discharge nozzle and the table or relative moves of both of the discharge nozzle and the table, and the discharge opening of the discharge nozzle is relatively moved in the two directions along the wheel design face, with a distance from the discharge opening to the wheel design face falling within a predetermined range.

2. The vehicle wheel decoration method according to claim 1, wherein
the wheel design face has a plurality of divided positions which are rotationally symmetric in a circumferential direction of the wheel body, and
in the decoration step, decoration is repeated for each of the plurality of divided positions due to rotation of the table and the decorative layer is eventually formed on an entire surface of the wheel design face.

3. The vehicle wheel decoration method according to claim 1, wherein in the decoration step, the decorative layer is formed on an entire surface of the wheel design face with an outline which is drawn along an outer edge of the wheel design face and a planate applied part which is drawn in an inner part except the outer edge in the wheel design face.

4. A vehicle wheel decoration device for decorating a wheel design face in a three-dimensional shape formed from a hub part to a rim part via a disc part in a wheel body, the vehicle wheel decoration device comprising:
a discharge nozzle which is provided so as to face the wheel design face of the wheel body;
a table which detachably holds the wheel body;
a driver which relatively moves one of the wheel body held in the table and the discharge nozzle or both of the wheel body and the discharge nozzle in at least two directions which extend along the wheel design face and cross each other and a direction which crosses moving directions toward the two directions; and
a controller which performs operation control of the discharge nozzle and the driver, wherein
the discharge nozzle has a discharge opening which discharges paint toward the wheel design face to form a decorative layer on the wheel design face, and
the controller performs control such that the table is tilted with respect to the discharge nozzle such that a distance from the discharge opening to the wheel design face falls within a predetermined range, and the discharge nozzle relatively moves in the two directions along the wheel design face, by using the driver.

5. The vehicle wheel decoration device according to claim 4, further comprising:
an actuator which rotationally moves the table in a circumferential direction of the wheel body, wherein the controller performs control such that decoration is repeated for each of a plurality of divided positions which are rotationally symmetric in the circumferential direction of the wheel body in conjunction with rotation of the table by the actuator, and the decorative layer is eventually formed on an entire wheel design face.

6. The vehicle wheel decoration device according to claim 4, wherein the decorative layer has an outline which is drawn along an outer edge of the wheel design face, and a planate applied part which is drawn in an inner part except the outer edge in the wheel design face.

7. A vehicle wheel which is manufactured by the vehicle wheel decoration method according to claim 1.

8. The vehicle wheel decoration method according to claim 2, wherein in the decoration step, the decorative layer is formed on the entire surface of the wheel design face with an outline which is drawn along an outer edge of the wheel design face and a planate applied part which is drawn in an inner part except the outer edge in the wheel design face.

9. The vehicle wheel decoration device according to claim 5, wherein the decorative layer has an outline which is drawn along an outer edge of the wheel design face, and a planate applied part which is drawn in an inner part except the outer edge in the wheel design face.

10. A vehicle wheel which is manufactured by the vehicle wheel decoration device according to claim 4.

* * * * *